US012656096B2

(12) United States Patent
Rohner et al.

(10) Patent No.: US 12,656,096 B2
(45) Date of Patent: Jun. 16, 2026

(54) TOUCH TRIGGER PROBE WITH CAPACITIVE SENSOR

(71) Applicant: HEXAGON INNOVATION HUB GMBH, Heerbrugg (CH)

(72) Inventors: Marcel Rohner, Grub AR (CH); Vincent Michel, Balgach (CH); Nikolay Khanenya, St. Gallen (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 112 days.

(21) Appl. No.: 18/525,364

(22) Filed: Nov. 30, 2023

(65) Prior Publication Data

US 2024/0200924 A1 Jun. 20, 2024

(30) Foreign Application Priority Data

Dec. 15, 2022 (EP) ..................................... 22213863

(51) Int. Cl.
*G01B 7/016* (2006.01)
*G01B 7/04* (2006.01)
(52) U.S. Cl.
CPC .............. *G01B 7/016* (2013.01); *G01B 7/044* (2013.01)
(58) Field of Classification Search
CPC ........ G01B 7/016; G01B 7/012; G01B 7/044; G01B 7/08
See application file for complete search history.

(56) References Cited

U.S. PATENT DOCUMENTS 4,084,323 A * 4/1978 McMurtry ............. G01B 7/012
                                                    33/561
4,270,275 A    6/1981 McMurtry 5,299,361 A * 4/1994 Fiedler ................... G01B 5/012
                                                    33/561
6,449,861 B1 * 9/2002 Danielli ................. G01B 5/012
                                                    33/503
6,760,977 B2    7/2004 Jordil et al.
7,347,000 B2    3/2008 Jordil et al.
11,644,299 B2 * 5/2023 Hamner .............. G01D 5/2053
                                                    33/503

(Continued)

FOREIGN PATENT DOCUMENTS

DE        3713415 A1    11/1988
EP      0 764 827 A2     3/1997
EP      1 610 087 A1    12/2005

OTHER PUBLICATIONS

Extended European Search Report dated Jun. 5, 2023 as received in Application No. 22213863.8.

*Primary Examiner* — Christopher E Mahoney
(74) *Attorney, Agent, or Firm* — Maschoff Brennan

(57) ABSTRACT

A touch trigger probe with a capacitive sensor for measuring three degrees of freedom with a sensor base and a sensor head which is spaced to the sensor base by a flexible suspension and can be capacitively coupled to the sensor base, whereby the suspension enables a relative movement in three degrees of freedom of the sensor head with respect to the sensor base following a displacement (d) of a probe tip when contacting the object with the probe tip. The suspension and the sensor are adapted to each other in such a way that there is a bijective map between the three degrees of freedom measured by the sensor and all three translational degrees of freedom of the displacement (d) of the probe tip center (C).

11 Claims, 4 Drawing Sheets

(56)  References Cited

U.S. PATENT DOCUMENTS

| 2003/0048592 A1 | 3/2003 | Thomas et al. |
| 2003/0101609 A1 | 6/2003 | Jordil et al. |
| 2013/0298416 A1 | 11/2013 | Collingwood et al. |

* cited by examiner

TOUCH TRIGGER PROBE WITH CAPACITIVE SENSOR

BACKGROUND

The present disclosure relates to a touch trigger probe for coordinative tactile measurement of an object according to claim 1.

It is common practice to inspect work pieces or objects subsequent to or in-line of production on a coordinate positioning apparatus such as a CNC-machine (Computer Numerical Control) in order to check for correctness of predefined object parameters, like dimensions and shape of the object. In a conventional 3-D coordinate measurement machine, a probe is supported for movement along three mutually perpendicular axes (in directions X, Y and Z). Thereby, the probe can be guided to any arbitrary point in space of a measuring volume of the machine and the object is measurable with a measurement sensor of the probe. For measuring surface variations, measurement principles based on usage of tactile or contact probes are known.

Such tactile, contact or touch probes are well known for dimensional metrology. In a typical case, a touch probe is releasably mounted on the mobile platform of a CNC-machine and the machine is programmed to bring the touch probe in contact, by a feeler provided for this task, with a workpiece. The feeler typically consists of a precise ruby sphere at the tip of an elongated stylus and, when it touches the workpiece, the probe triggers an electric signal indicating that a contact has occurred. This signal is transmitted to a control unit that records the actual position of the mobile platform resp. the probe and calculates the coordinates of the contact point on the workpiece. In a simple form of the machine, a suitable position encoder mounted parallel to each axis is able to determine the position of the probe relative to a base of the machine and, therefore, to determine the coordinates of a measurement point on the object being approached by the probe. For providing movability of the probe, the mobile platform may comprise a frame structure such as a gantry design on which the probe is arranged and driving means for moving frame components of the frame structure relative to each other.

In a known form of touch trigger probes, for example as disclosed in EP0764827, U.S. Pat. No. 4,270,275 or U.S. Pat. No. 6,760,977, the stylus is fastened onto a support with three radial pins arranged symmetrically, each resting on two spheres integrally united with the probe's body. This arrangement constitutes an isostatic connection with six independent contact points; the relative position of the stylus in relation to the probe's body is thus accurately defined. The trigger signal is generated when one of the pins lifts off the two spheres on which it normally rests, thus interrupting the electric contact between the two spheres. These probes of simple construction combine reliability and accuracy but suffer from several limitations. For example, the sensitivity of the probe to an external force is not constant but varies according to its direction, exhibiting three lobes in the transverse plane corresponding to the directions of the three pins, and a different sensitivity to axial movement than to transverse ones. This variation of the sensitivity is detrimental to the repeatability of the touch triggering and thus to the quality of the measurement. Altering the arrangement of the pins, as described for example in EP1610087 or DE3713415, can reduce this anisotropy, without eliminating it completely, however. In other known touch probes, the contact between the stylus and the part to be measured is detected by a vibration sensor or by optical means.

In trigger probes known in the art there is another difficulty in accurately relating the instant at which the stylus engages the workpiece to the instant at which the switching signal is triggered or received by the machine. This displacement of the stylus between these two events of object contact and signal triggering is often called the pre-travel (error) of the stylus. It is not uniform for all conditions of operation, e.g. since the measurement by the measuring devices of the machine is carried out while the probe is in motion, then, for a given speed of that motion, any variation in pre-travel results in a variation in the measurement. Further, the pre-travel may be different for different directions of displacement of the stylus relative to the base.

SUMMARY

Thus, an object of the present disclosure is to provide an improved touch trigger probe.

Another object is to provide a contact probe for a three-dimensional measuring instrument that enables improved accuracy of three-dimensional measurement.

The disclosure relates to a touch trigger probe for tactile measurement of coordinates of an object. The touch trigger probe has a probe tip and comprises a capacitive sensor for sensing three degrees of freedom (DoF). The capacitive sensor comprises a sensor base and a sensor head which is spaced to the sensor base (in an axial direction or z-direction) by a suspension and can be capacitively coupled to the sensor base, whereby the sensor head follows a displacement of the probe tip center when contacting the object with the probe tip, whereby the probe tip can be displaced at least in three translational degrees of freedom.

The suspension is flexible and enables a relative movement in three degrees of freedom of the sensor head with respect to the sensor base following a displacement of the probe tip center when contacting the object with the probe tip in such a way that there is a bijective map between said three degrees of freedom which are sensed by the sensor and all three translational degrees of freedom of the probe tip displacement.

Preferably, a movement of the probe's tip center in three only translational degrees of freedoms results into a movement of the sensor head which is translational as well as rotational i.e. a movement which is neither purely translational nor purely rotational but a translation of the probe tip center induces a rotation at the sensor.

Optionally, the suspension has three degrees of freedom with (much) higher stiffness than the other three DoFs which decreases the complexity of the bijective mapping.

As a further option, the suspension has isotropic mechanical stiffness in at least two of its three (highly) flexible or free degrees of freedom.

As another option, the suspension comprises two axially symmetric disc-shaped membranes, spaced a distance to each other in axial direction (z-axis direction). The stiffness of the membranes and their distance are adapted to each other in such a way that the joint stiffness of both membranes against radial deflection of the probe tip (parallel to disc-plane) is approximately equal to, in particular of the same order of magnitude as, the joint stiffness of both membranes against axial deflection of the probe tip (perpendicular to disc-plane).

In some embodiments, the probe comprises a mechanical interface for safety decoupling of the sensor chamber with a preforce and decoupling stiffness adapted to the stiffness of the suspension to allow for a measurement trigger at a defined threshold deflection (the triggering deflection) that is lower than the decoupling deflection. For example, the mechanical interface has a coupling stiffness which is (much) larger than the stiffness of the suspension and a decoupling stiffness which is (much) lower than the stiffness of the suspension whereby the mechanical interface is preloaded with a preload or preforce adapted to the suspension and selected in such a way that:

before a measurement is triggered, the mechanical interface remains coupled at all times during a nominal operation, after a measurement is triggered, the mechanical interface might be decoupled, allowing for a much larger excessive deflections without damaging the probe.

Additionally or alternatively, the sensor base comprises electrodes distributed in a (lateral) plane as multiple concentric arc segments at different radii, in particular separated in at least three, for example four, six or ten, circular sectors and the sensor head comprises multiple conductive, circular protrusions for the capacitive coupling to the base. The protrusions are spaced to each other and aligned to a respective arc segment or a pair of differential arc segments in the lateral plane when the sensor is in a rest position. Preferably, each protrusion is associated with a set of differential arc segments whereby the arc segments are radially arranged with alternating polarity. As a further option, the protrusions are aligned in such a way that each protrusion is centered (in the rest position) to the middle of a pair of differential arc segments (middle in radial direction).

Embodiments with such an electrode distribution and with a suspension with isotropic mechanical stiffness in at least two of its three free degrees of freedom have optionally a capacitive sensor designed for a (at least nearly or approximate) isotropic response in the two of its three measured degrees of freedom that are well aligned with the two isotropic degrees of freedom of the suspension.

As another further option, the touch probe is designed to determine the displacement of the probe tip center by a relation, in particular a ratio, of differential capacitance and a total capacitance, whereby preferably the differential and total capacitances are normalized.

As still another further option, the sensor is designed to minimize a coupling of the two isotropic degrees of freedom to the third degree of freedom by minimizing the effect of fringe capacitances. Thereby, the radial width of the base electrodes is larger than the radial width of the protrusions in such a way that the fringe capacitances are substantially independent of lateral/radial position. Alternatively or additionally, the protrusions are symmetrically designed in radial direction such that the fringe capacitances on each side of a protrusion are substantially equal and/or the diametral fringe capacitances are associated with the two polarities such that the total fringe capacitance cancels in a differential measurement.

In some embodiments, the sensor head is rotationally symmetric around the axial direction/z-axis.

The disclosure relates also to a method for contact triggering with an inventive touch trigger probe as described above. The method comprises moving the touch trigger probe in a measurement volume for contacting an object and measuring displacements of the probe tip center with the capacitive sensor at a regular measurement rate when contacting the object with the probe tip whilst further moving the touch trigger probe with constant velocity and extrapolating a future time for a trigger point based on at least a first displacement measured at a first past time and a second displacement measured at a second past time in knowledge of a pre-determined pre-travel.

Optionally, when using a touch probe with a sensor base comprising electrodes distributed in a lateral plane as multiple concentric arc segments at different radii and the sensor head comprising multiple conductive, circular, spaced protrusions for capacitive coupling, being aligned to a respective arc segment in the lateral plane when the sensor is in a rest position as described above, the method comprises sequential capacitive measurements for a given displacement whereby electrode segments inactive at a time of a capacitive measurement serve as guarding electrodes.

As another option, the method comprises determining a rest position, in particular during measurement operation, and using the determined rest position for compensation of the pre-travel with respect to orientation-dependent gravity effects.

Alternatively or additionally, the method comprises correcting a residual deviation between the (mathematical) axes of the suspension and the (mathematical) axes of the sensor defined by the probe geometry using a stored map such as an interpolation look-up table. That is, a residual deviation of the geometries of suspension and sensor is correctable using a stored correction map with defined correction values.

The present disclosure also relates to a computer program, which is stored on a machine-readable carrier, or computer data signal having program code, for controlling and/or carrying out the inventive method, in particular when the program is executed in a control and analysis unit of an inventive touch trigger probe and/or a control and analysis unit of a measuring machine having an inventive touch trigger probe.

BRIEF DESCRIPTION OF THE DRAWINGS

The method and the system are described or explained in more detail below, purely by way of example, with reference to working examples shown schematically in the drawings. Specifically.

DETAILED DESCRIPTION

Figure 1:
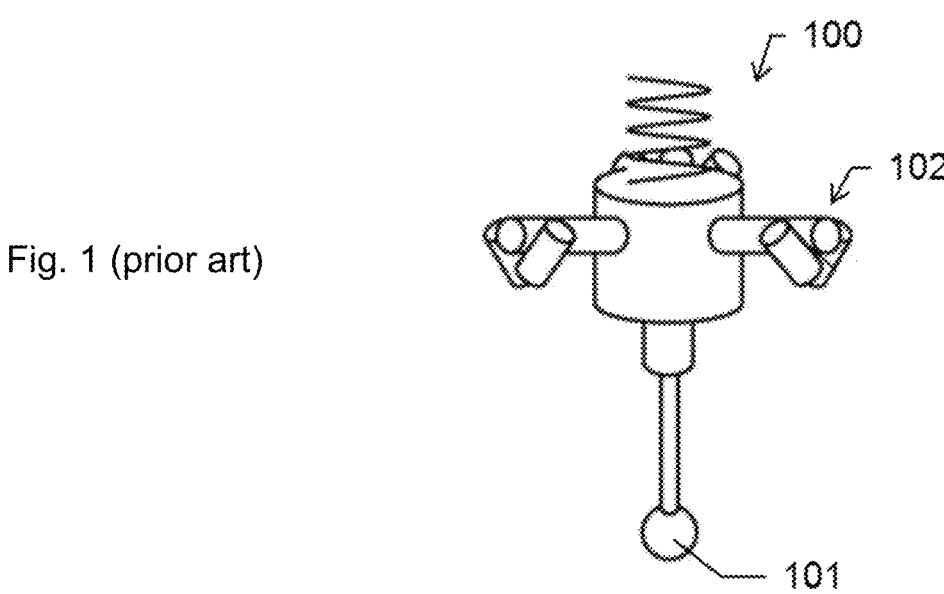
FIG. 1 shows a touch trigger probe according to prior art.

FIG. 1 shows a typical touch trigger probe 100 known from prior art. The probe 100 comprises a touching element with a probe tip 101 for touching an object to be measured and determining a corresponding positional coordinate of the touched point at the object. Touch trigger probes like the one of FIG. 1 are commonly used with CNC machine measurement applications to trigger an evaluation of the position of the touching point at the object surface. Shown is a switching sensor. Then the position of the probe tip 101 is evaluated based on the axis encoder and the touch trigger probe deflection.

The stylus is attached to a tripod structure, whose three cylindrical arms 102 are supported by three pairs of crossed cylinders. It is a kinematics mechanism, which acts on the spring, thereby restoring the stylus to its original position.

In case the stylus touches an object and thus is deflected from its origin position a signal is provided via the cylindrical arm 102 and indicates the deflection and with that the touching of the object. Thereby, the deflection is measured continuously and a trigger is emitted as soon as a deflection threshold is exceeded.

Due to the mechanical design of the probe, for example as depicted with three mechanical contact points that are spaced 120° apart, the trigger force is not constant in all directions and the resulting accuracy also looks correspondingly inhomogeneous, due to the fact that the bending of the stylus is a direct function of the force. Such error typically is also called "lobing error".

Figure 2:
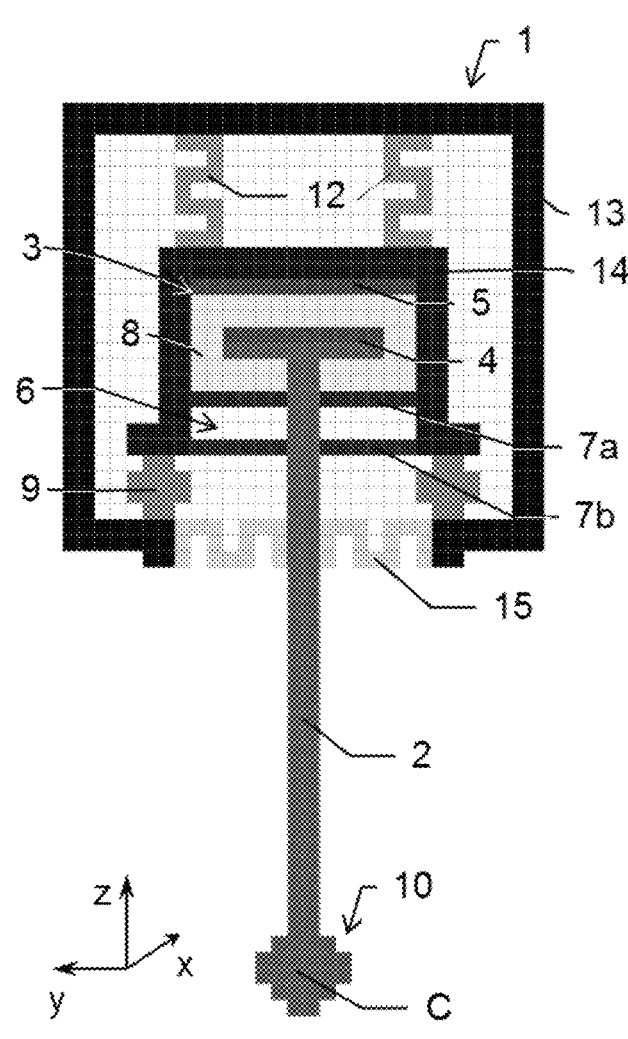
FIG. 2 shows an embodiment of a capacitive touch trigger probe.

FIG. 2 shows an embodiment of a touch trigger probe 1 in a rest position as a schematic cross sectional view. The probe 10 comprises a housing 13 wherein a metrology or sensor chamber 14 is arranged using springs 12 and a mechanical interface 9. The probe 1 can have a processing unit and a communication interface (not shown). The chamber 5 houses a capacitive sensor 3 with a sensor base 5 and a sensor head 4 spaced thereto in the axial or z-direction ("vertical"). Base 5 and head 4 are capacitively coupled to each other. The capacitive sensor 3 can measure three degrees of freedom.

The base 5 can be fastened to the chamber 14 for example using a grounded copper ring which serves as contact point to glue the base 5, e.g. by a bottom side of a base's PCB, on the chamber 14. Such an arrangement allows for, e.g. temperature induced, lateral movements on the contact surface between base 5 and chamber 14. Contact on the bottom side of a PCB ensures that changes in thickness due to manufacturing tolerances and temperature changes don't affect the distance between head and electrode. If the stack is symmetrical, the changes induced by temperature on a PCB are identical on both side, thus hindering the bending of the PCB.

In the example, the chamber 5 is filled with a dielectric fluid 8 in order to increase the sensitivity of the capacitive sensing element 3 by higher dielectric constant and to increase the uniformity of the thermal state by higher thermal conductivity compared to an air filled chamber 14. The volume of the housing 13 can also be filled with a fluid, e.g. a dielectric fluid, to increase mechanical damping.

The sensor head 4 is arranged on top of a stylus 2, hence sensor head 4 is mechanically coupled to and follows a displacement of stylus 2. In other words, stylus 2 and therewith sensor head 4 can move with respect to the sensor base 5 when the tip 10 of the stylus 2 is deflected—and therewith the probe tip center C is displaced—via a flexure mechanism or suspension 6, whereby the stylus 2 protrudes out of the housing 1 through an opening 15 with a hermetic seal.

The suspension 6 is flexible with regard to at least three degrees of freedom (DoF), whereby the suspension 6 and the sensor 3 are adapted to each other in such a way that there is a bijective map between the three degrees of freedom measured by the sensor 3 and all three translational degrees of freedom of the displacement of the center C of the probe tip 10. In other words, a (translational) 3-DOF movement of the probe's tip center C is sensed by the capacitive sensor 3 with regard to exactly three—not necessarily translational, e.g. not purely linear nor angular but mixed— degrees of freedom via suspension 6 and probe head 4.

If for example the device 1 is implemented as a scanning probe, then the sensed three degrees of freedom are recalculated by the bijective mapping into three linear coordinates (or translations) that are reported as measurements. If the device 1 is implemented as a touch trigger probe, then the sensed degrees of freedom are recalculated into a single discrete one (i.e., "touched"/"not touched" signal) that is reported as a measurement.

In the example, the suspension 6 is embodied as two axially symmetric disks 7a, 7b whereby the stiffness of a respective disk 7a, 7b is the same along all in-plane directions. The distance between the membranes 7a, 7b is selected so that their common stiffness against the horizontal or lateral deflection (in xy-plane) of the sensing element's head 4 is at least approximately equal, i.e. of the same order of magnitude at least, to their common stiffness against its axial or z-deflection. Hence, the suspension has a flexure mechanism with isotropic mechanical stiffness in at least two of its three free DoF. Such a mechanical suspension showing a coupling between translations and rotations with a stiffness having a high order of symmetry results in a low lobbing error.

The springs 12 are pushing the chamber 14 against the interface 9 to keep the latter coupled during the measurement, having a coupling stiffness which is larger than the stiffness of the suspension 6 to minimize an asymmetric contribution into the deflection of the head 4. So, during the measurement, the stylus 2 moves only by deforming the membranes 7a,b until the measurement trigger signal is generated.

Further, the stiffness of the interface 9 is much larger than the stiffness of membranes 7a,b. The springs 12 and the mechanical interface 9 allow for safety decoupling as a contingency measure in case if machine fails to stop pushing the probe 1 into a workpiece after a measurement is triggered as further described by FIG. 6 below.

As different styli 2 might have a different mass, which results in different initial deflections of the flexure, the weight of a respective stylus 2 is optionally compensated. Such a contact trigger probe 1 as depicted allows for high measurement accuracy, e.g. below 500 nm, thereby needing only low power consumption, e.g. less than 20 mW.

Figure 3:
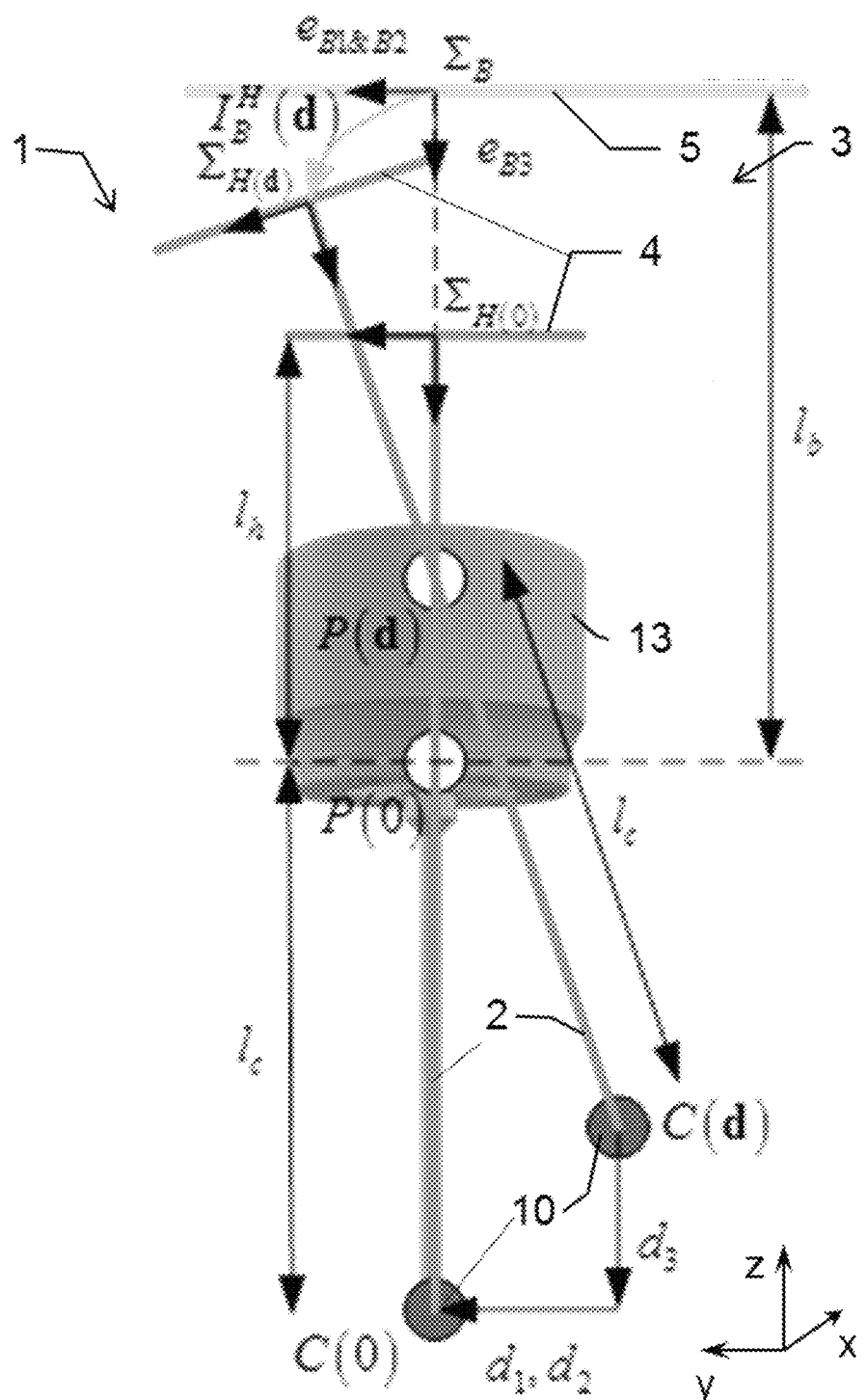
FIG. 3 illustrates a geometrical model of a capacitive touch trigger probe.

FIG. 3 illustrates a geometrical model of a touch trigger probe 1 with a capacitive sensor 3 with sensor base 5 and sensor head 4. Depicted are a rest or zero position of the probe where the stylus 2 is oriented straight in z-direction and a deflection position where the stylus 2 is deflected as is the case when measuring a workpiece. The capacitive sensor 5 measures the isometry of the movable sensor head 4, coupled to the stylus 2, to the fixed sensor base 5. The head 4 moves with respect to the base 5 when the probe tip 10 is deflected via a flexure mechanism as described above. The purely geometrical model discussed by FIG. 3 describes the relation between head-to-base isometry to the probe tip deflection with C(d): probe tip center point, d: negative displacement vector, P(d): pivot point, $I_B^H(d)$: isometry from base 5 to head 4, $l_c$: distance of probe tip center point to pivot point (stylus length plus an offset)

The probe tip center point C is offset by the displacement d from the rest position $[0, 0, l_b + l_c]$. The pivot point P(0) moves in z when the stylus is deflected by d (assuming a perfect mechanical setup with a pure z-translation of the pivot point without any coupling with the angular degrees of freedom). A translation of the sensor head 4 with respect to the sensor base 5 due to the displacement of the probe tip (center) also induces a tilt (a rotational movement).

A residual deviation between the suspension axes and the sensor axes can be corrected using a stored map with correction values such as an interpolation look-up table. As an option, normalized differential capacitive measurement values for the lateral directions x,y and the normalized sum of the capacitances for the vertical direction z in a given relative position of sensor base 5 and sensor head 4 are mapped to a normalized displacement value for three translational degrees of freedom over the full measurement volume of the sensor 3.

Figure 4A:
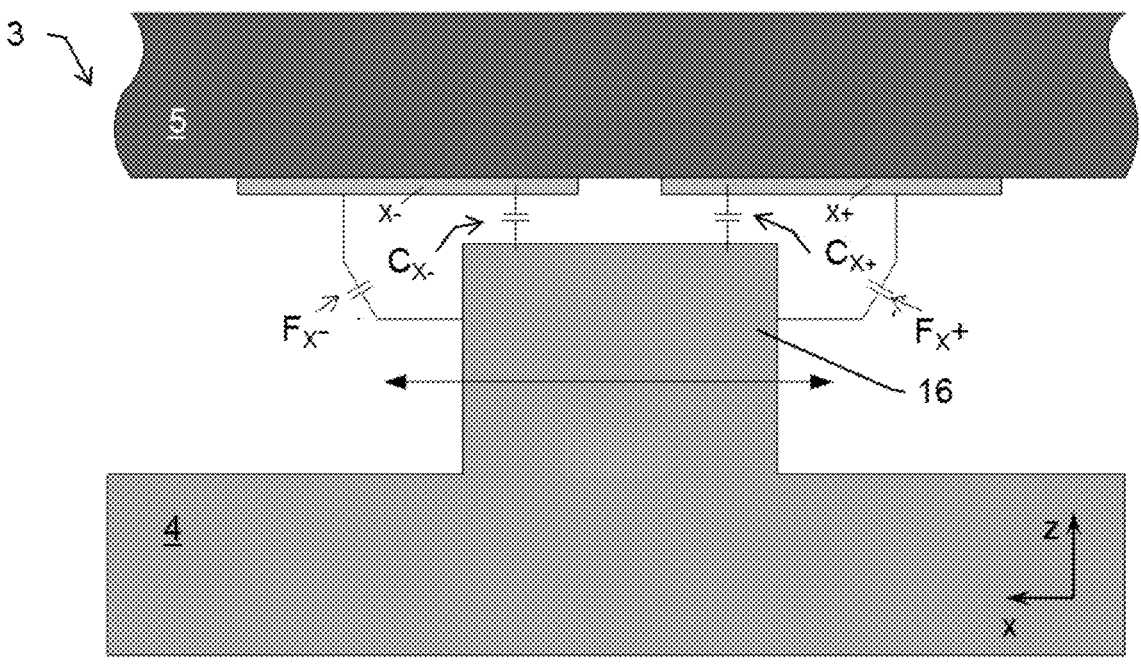
FIG. 4a,b show schematically an exemplary embodiment of a capacitive sensor.
Figure 4B:
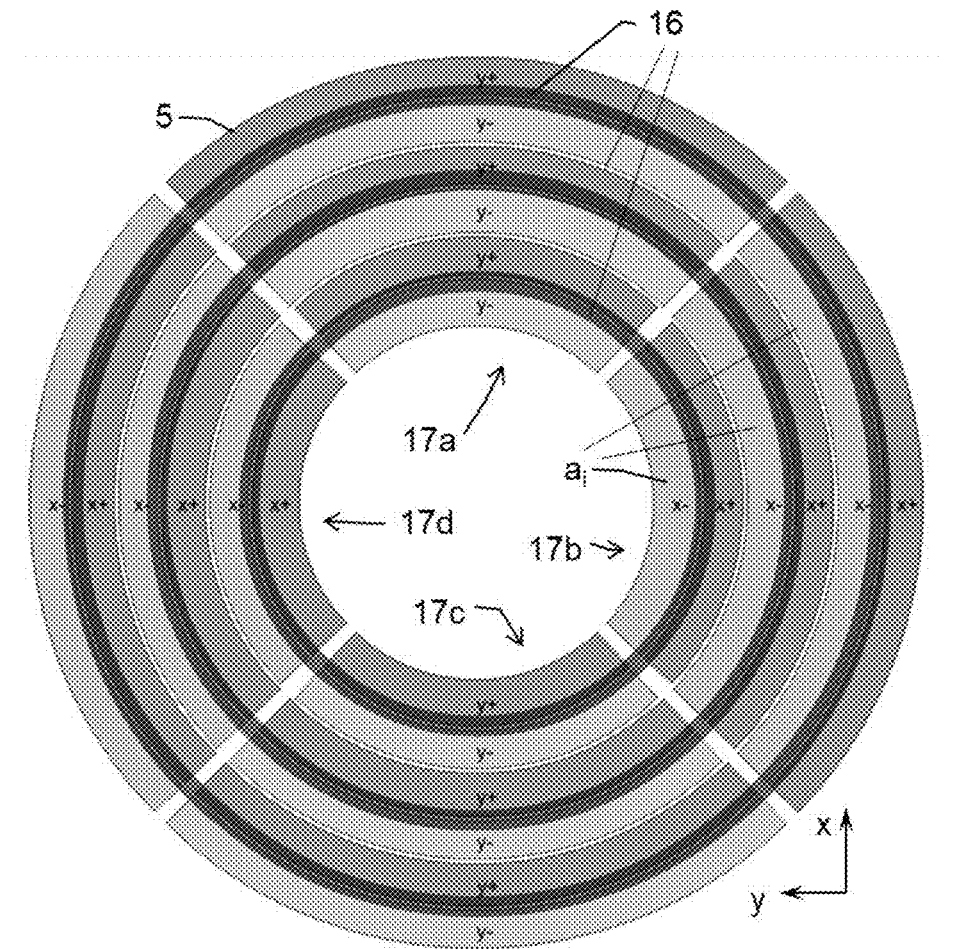

FIGS. 4a,b show schematically an exemplary embodiment of a capacitive sensor 3 with a base 5 having electrodes, e.g. a PCB, and a head 4 which are moveable relative to each other, whereby FIG. 4a shows the sensor 3 in a cross sectional view and FIG. 4b only the electrode arrangement in a top view.

The sensor 3 measures the capacitive coupling between two electrodes X+ and X− of the base 5 and the head 4—which is conductive, e.g. metallic, and connected to ground—and therewith the displacement of the head 4 with respect to the base 5. The head 4 is structured and comprises protrusions 16 spaced to each other, of which one is depicted in FIG. 5a. The protrusions cross section is of rectangular shape. The relative position of the head 4 to the base 5 changes the planar overlap and thereby the capacitances $C_{X+}$ and $C_{X-}$ between the electrodes X+ and X− and the protrusion 16. Parasitic fringe capacitances $F_{X-}$, $F_{X+}$ which are also present change only little; they do not depend or only little on translation by making the base electrodes X+ and X− wide enough compared to the width of the protrusion 16. The sensor 3 measures the difference of capacitance between $C_{X+}$ and $C_{X-}$ to measure a translation along the x-axis. The fringe capacitances $F_{X+/-}$ are symmetrical and cancel-out by taking the difference between the measured capacitances on X+/X−. The measurement along the y-axis work similarly. For the measurement in the z-axis, the sensor 3 uses the sum of the capacitances $C_{X+/-}$ and $C_{Y+/-}$ (cf. also equations 1-3 below).

In general, the sensor 3 is preferably designed to be symmetrical (rotational symmetric about the z-axis), as can be seen in the depiction of FIG. 4b of this exemplary embodiment. Rotational symmetry ensures that the influence of any perturbation is similar on all measurement channels. The edges of the protrusions 16 are manufactured to be sharp and sufficiently deep, to minimize the parasitic fringe capacitance $F_{X+/-}$. Other parasitic capacitances can be suppressed by guarding.

Signal processing is used to determine both lateral (xy) and axial (z) displacement, whereby the sensor 3 measures the two orthogonal lateral displacements x and y independently using differential electrodes X+/X− and Y+/Y− and the z-displacement by the total coupling capacitance to the head 4. Hence, the sensor 3 can show at least a nearly isotropic response in the two of its three measured degrees of freedom—here x,y—that are well aligned with the two isotropic degrees of freedom of the suspension (cf. FIG. 2).

As shown in FIG. 4b, for measuring x- and y-displacement, two sets of electrodes X+/X− and Y+/Y− are arranged circularly in—in the example four—sectors 17a-d. Each electrode X+/X− or Y+/Y− consists of multiple arc segments at different radii (in the example six). The segments are arranged in an alternating way, such that individual protrusion 16 (three protrusions as indicated in FIG. 4b) on the head 4 are associated with and preferably centered with respect to a pair (+/−) of arc segments. That is, at each same radii opposite pairs of arc segments of opposite electrical polarity are provided, with alternating polarity of arc segments successive in radial direction. "+" and "−" electrodes are arranged in an alternated pattern such that what is positive on one quadrant is negative on the other, i.e. a diametral anti-symmetry. Each pair of arc segments increases the sensitivity of the sensor 3.

When moving the head 4, which e.g. has a diameter of 20 mm, relative to the base 5, the electrode signal changes proportionally to the overlap between protrusion 16 of the head 4 and the electrode, resulting in a differential signal as the increase on the one electrode X+ or Y+ corresponds to the decrease on the second electrode X− or Y−.

As exemplified in the following, capacitances are measured with respect to a reference capacitance $C_{Ref}$ which can be used to normalize the total coupling capacitance. For the z-direction, a calibrated constant $C_{z0}$ can be used for normalizing. Since signal processing only considers relations of capacitances such as the ratios given below, the exact value of the reference capacitance $C_{Ref}$ only weakly impacts the measurement results in x/y.

Consider $C_{x+}$, $C_{x-}$, $C_{y+}$, $C_{y-}$ are the measured capacitances related to the same point of time and $C_{0x}$, $C_{0y}$, $C_{z0}$ calibration constants. Then the following values $r_1$, $r_2$, $r_3$ can be computed by following ratios:

$$r_1 = \frac{c_{x+} - c_{x-}}{c_{x+} + c_{x-} + c_{0x}},$$
$$r_2 = \frac{c_{y+} - c_{y-}}{c_{y+} + c_{y-} + c_{0y}}$$
$$r_3 = \frac{c_{x+} + c_{x-} + c_{y+} + c_{y-} + c_{0x} + c_{0y}}{c_{z0}} - 1$$

At the rest position, the differential capacitances cancel such that $r_1 = r_2 = 0$. Further, $C_{z0}$ is chosen such that r3=0 at rest position. The equations and for $r_1$ and $r_2$ use the sum $c_+ + c_- + c_0$ to normalize the differential measurement. This makes the computed value (for x/y displacement) more robust against capacitance changes due to environmental factor (e.g. temperature or humidity) and to changes in the reference capacitance. Then, $r_1$, $r_2$, $r_3$ are mapped to the (normalized) displacement of the probe tip.

Said calibration constants ($C_{0x}$, $C_{0y}$, $C_{z0}$) are defined by calibration. The results $r_1$, $r_2$, $r_3$ are mapped to the displacement in all three degree of freedom over the full measurement volume of the sensor 3. The value of $C_{0x}$, $C_{0y}$, $C_{z0}$ is computed such that mapping results in the smallest error between a known reference and the calibration measurement. By another calibration on the CNC, the stylus length and other system parameters can be taken into account as in principle known in the art.

The capacitances $C_{x+}$, $C_{x-}$, $C_{y+}$, $C_{y-}$ are measured either simultaneously or sequentially (or both: simultaneously measuring all X-capacitances and then simultaneously measuring all Y-capacitances). When measuring simultaneously, all electrodes are excited with the same voltage and the individual measuring channels are synchronized. When measuring sequentially, a linear interpolation to the same point in time may be applied assuming capacitances to change at a constant rate within a time window or time-reversed sequences to obtain capacitances within a time window. As another option for sequential measuring, the in-active set of electrodes may act as guard electrodes, e.g. for suppressing parasitic capacitances as mentioned above.

In general, guarding is used to reduce the influence of stray capacitance on the measurement. Guarding consists in wrapping the measurement path with a surface kept at the same potential as the measurement path, so that any capacitance between the path and the surface has the same potential on each side and therefore has no influence on the measurement.

The design is made to keep the total guard capacitance small, otherwise imperfections of the electronics that drives the guard would negatively impact sensor precision.

Using inactive measurement electrodes as guard avoids additional or separate guard electrodes between each measurement line and parasitic capacitance from one electrode to another (i.e. X+ to X−/Y+/Y−).

Figure 5:
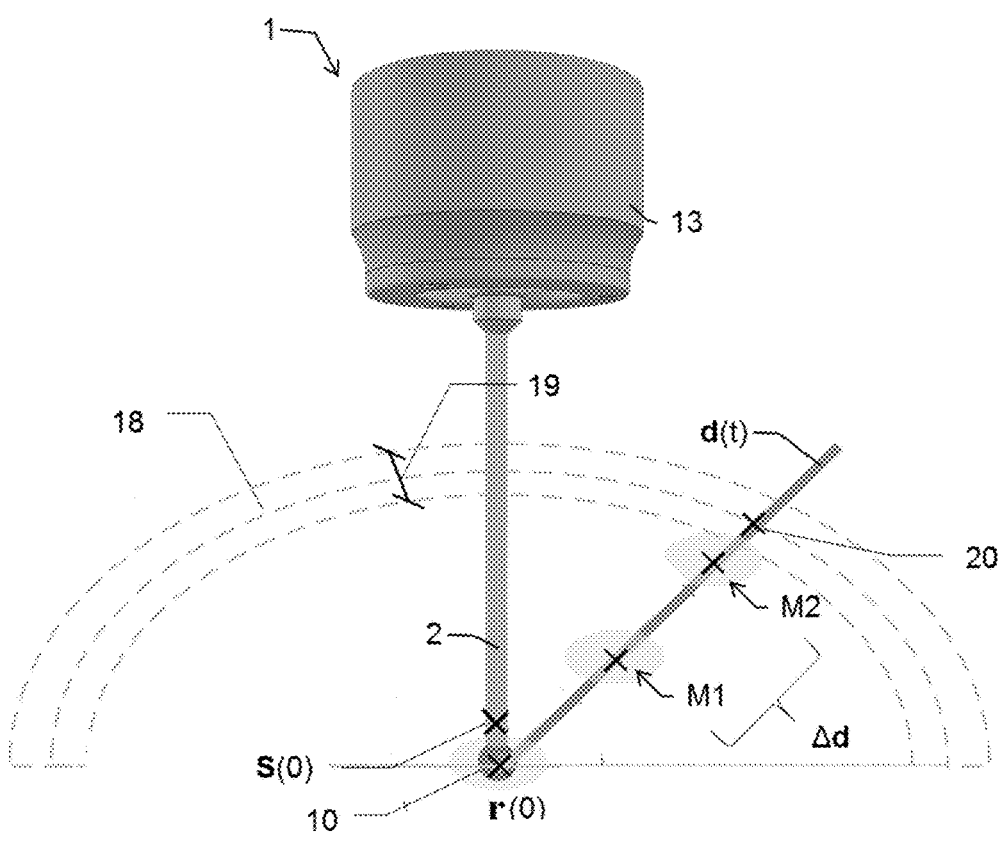
FIG. 5 illustrates schematically a trigger concept for an inventive touch trigger probe.

FIG. 5 illustrates schematically a trigger concept for an inventive touch trigger probe 1. A trigger signal is emitted when the displacement trajectory d(t) crosses a pre-travel ellipse 18, given by the sensor geometry (length of stylus 2 not known but taken into account with a CNC routine calibration as mentioned above), within a certain trigger tolerance 19. Deviations from ellipticity are typically negligible if flexure stiffness of the stylus 2 is high (pre-travel short and measurement rate high).

Depicted is a displacement trajectory d(t) from an arbitrary rest position r(0) that might differ from the sensor zero position S(0). The rest position r(0) can be determined, for instance during measurement operation, and be used for compensation of the pre-travel 18 with respect to orientation-dependent gravity effects. The 3D-displacement is measured using the capacitive displacement sensor described above by at least two measurements, i.e. M1, M2, at relatively low measurement rate so that the travel length Δd between two measurements, e.g. between M1-M2, can be much larger than the required triggering precision. The precise trigger time or point 20 is extrapolated from the past measurements M1, M2 assuming a constant displacement velocity v, whereby time is measured with high rate.

Hence, a future time for a trigger point is extrapolated based on at least a first displacement measured at a first past time d(t1) and a second displacement measured at a second past time d(t2) in knowledge of a pre-determined pre-travel 18. The pre-travel 18 is defined large enough such that there are at least two measurements M1, M2 available, excluding sensor zero position S(0), for extrapolation at maximum displacement speed v.

Figure 6:
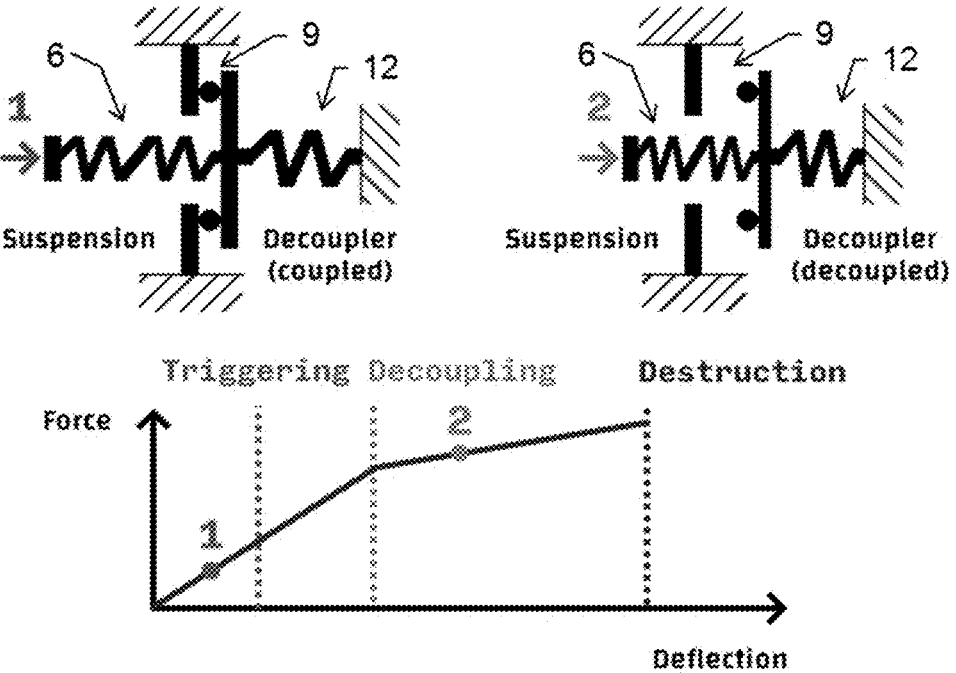
FIG. 6 illustrates schematically the procedure of triggering and safety decoupling.

FIG. 6 illustrates schematically the procedure of triggering and safety decoupling by suspension 6 and mechanical interface 9 with decoupling springs 12. The upper left side of the figure shows a first state during normal measurement operation, the upper right side a second state of probe decoupling whereby the lower part illustrates the first state of coupled probe and second state of decoupled probe in a corresponding (applied) force-(probe) deflection-diagram.

The preload of the mechanical interface 9 by springs 12 is adapted to the suspension 6 in such a way that until there is a triggering of a measurement, the mechanical interface 9 remains coupled at all times during a nominal operation. During the normal operation (i.e., if the CNC-machine reacts on the triggering signal fast enough), the decoupling should not occur at all as the machine should stop before exceeding the threshold force.

However in case that after the measurement is over, the stylus continues deflecting due to machine's latency and if latency is too high, the elastic force exceeds the preforce of springs 12 so that the interface 9 gets decoupled, preventing a damage of the suspension 6, e.g. its membranes, at least up to a certain force amount after which a destruction is not prevented any more.

Hence, the effective stiffness when coupled is the stiffness of suspension 6, whereas the effective stiffness when decoupled is the one of the springs 12, chosen to be lower than the stiffness of suspension 6.

Although aspects are illustrated above, partly with reference to some specific embodiments, it must be understood that numerous modifications and combinations of different features of the embodiments can be made and that the different features can be combined with measuring principles and/or touch trigger probes or CNC-machines known from prior art.

The invention claimed is:

1. A touch trigger probe for tactile measurement of coordinates of an object, the touch trigger probe comprising:
   a probe tip with a tip center (C) and
   a capacitive sensor having a sensor base and a sensor head which is spaced to the sensor base by a flexible suspension and can be capacitively coupled to the sensor base,
   whereby the sensor head follows a displacement of the probe tip center (C) when contacting the object with the probe tip,
   wherein the suspension is designed to enable a relative movement in three degrees of freedom of the sensor head with respect to the sensor base when contacting the object with the probe tip in such a way that there is a bijective map between these three degrees of freedom sensed by the capacitive sensor and all three translational degrees of freedom of the displacement (d) of the probe tip center (C),
   wherein the sensor base comprises electrodes (X+, X−, Y+, Y−) distributed in a lateral plane (xy) as multiple concentric arc segments (ai) at different radii, and
   wherein the sensor head comprises multiple conductive, circular, spaced protrusions for said capacitive coupling, being aligned to a respective arc segment (ai) or a pair of differential arc segments in the lateral plane (xy) when the sensor is in a rest position.

2. The touch trigger probe according to claim 1, wherein the suspension is designed to enable a relative movement in three degrees of freedom of the sensor head with respect to the sensor base, wherein a displacement (d) of the probe's tip center (C) in the three translational degrees of freedom results into a movement of the sensor head which is translational as well as rotational.

3. The touch trigger probe according to claim 1, wherein the suspension has isotropic mechanical stiffness in at least two of its three degrees of freedom.

4. The touch trigger probe according to claim 3, wherein the suspension comprises two axially symmetric disc-shaped membranes, spaced a distance to each other in axial direction (z), whereby the stiffness of the membranes and their distance are adapted to each other in such a way that the joint stiffness of both membranes against radial deflection of the probe tip center (C) is approximately equal to the joint stiffness of both membranes against axial deflection of the probe tip center (C).

5. The touch trigger probe according to claim 3, wherein the touch trigger probe comprises a mechanical interface for safety decoupling of the sensor head having a perforce and a coupling stiffness adapted to the stiffness of the suspension to allow for a measurement trigger at a defined threshold deflection.

6. The touch trigger probe according to claim 3, wherein the sensor is designed for a nearly isotropic response in the two of its three measured degrees of freedom that are well aligned with the two isotropic degrees of freedom of the suspension.

7. The touch trigger probe according to claim 6, wherein:
the sensor is designed to minimize a coupling of the two
  isotropic degrees of freedom to the third degree of
  freedom by minimizing the effect of fringe capaci-
  tances (FX+, FX−), whereby:
    the radial width of the electrodes (X+, X−, Y+, Y−) is
    larger than the radial width of the protrusions in such
    a way that the fringe capacitances (FX+, FX−) are
    substantially independent of lateral (xy) position,
    and/or
    the protrusions are symmetrically designed in radial
    direction such that the fringe capacitances (FX+,
    FX−) on each side of a protrusion are substantially
    equal, and/or
    the diametral fringe capacitances (FX+, FX−) are asso-
    ciated with the two polarities such that the fringe
    capacitances cancel (FX+, FX−) in a differential
    measurement, and/or each protrusion is associated with a set of differential
    arc segments (ai) such that the arc segments (ai) are
    radially arranged with alternating polarity.

8. The touch trigger probe according to claim 1, wherein
the electrodes (X+, X−, Y+, Y−) distributed in a lateral plane
(xy) as multiple concentric arc segments (ai) at different
radii are separated in at least three circular sectors (17a-d).

9. The touch trigger probe according to claim 1, wherein
the touch trigger probe is designed to determine the dis-
placement (d) of the probe tip center (C) by a relation of
differential capacitance and total capacitance.

10. The touch trigger probe according to claim 9, wherein
the relation of differential capacitance and total capacitance
is the ratio of differential capacitance and total capacitance.

11. The touch trigger probe according to claim 1, wherein
the sensor head is rotationally symmetric with respect to the
axial direction (z).

\* \* \* \* \*